United States Patent Office 2,920,319
Patented Jan. 5, 1960

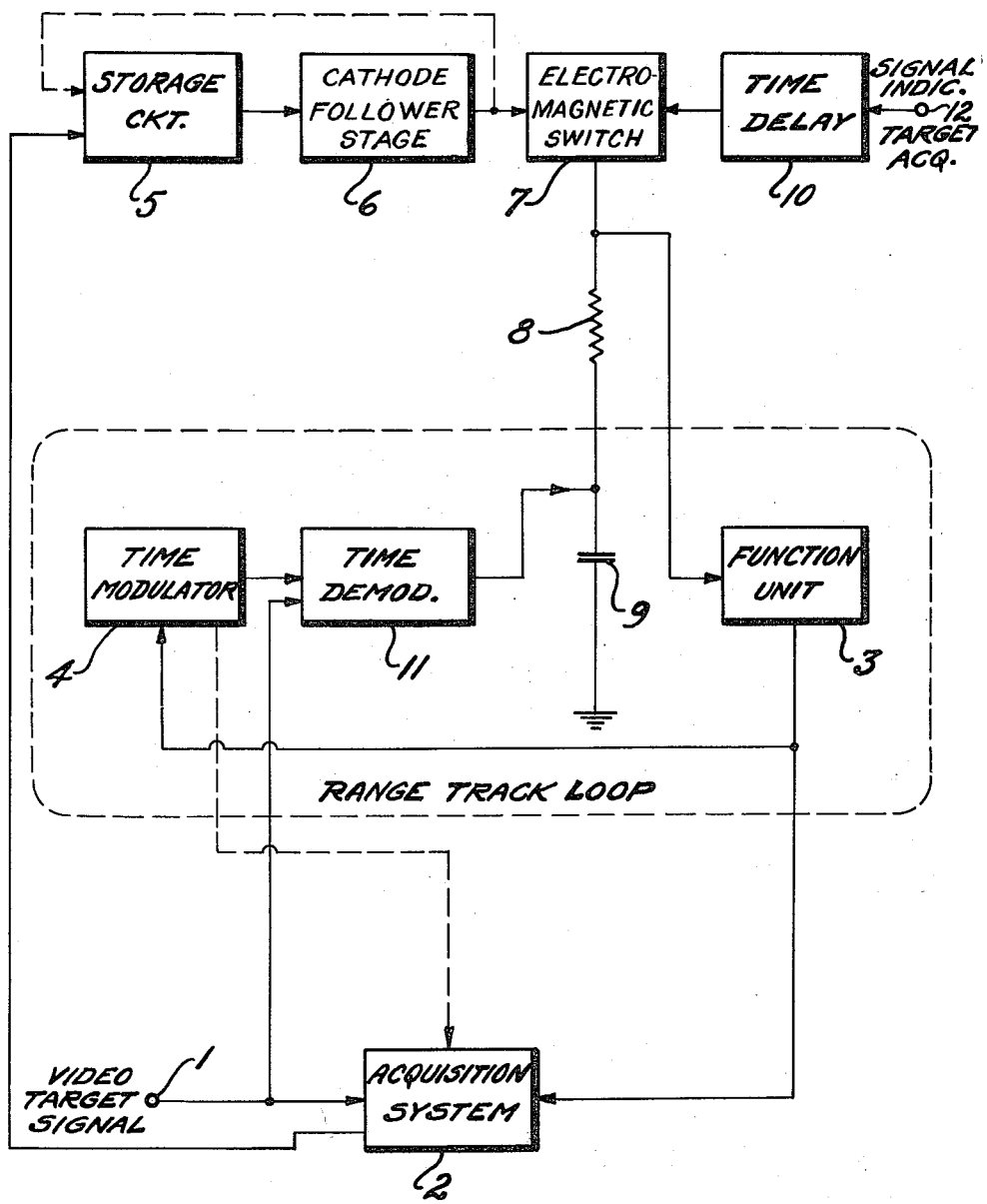

2,920,319
AUTOMATIC TRACKING SYSTEM

Harry B. Smith, Baltimore, and Walter Ewanus, Glen Burnie, Md., assignors, by mesne assignments, to the United States of America as represented by the Secretary of the Air Force Application December 10, 1957, Serial No. 701,941

5 Claims. (Cl. 343—7.3)

The present invention relates to a range tracking system, and more particularly, to the automatic acquisition of a target in a range tracking system.

In an object-locating radio system it is highly desirable to utilize a range tracking system. The rapidity of response and higher-accuracy control provided by a range tracking system are of value especially for high accuracy antiaircraft radars. Time-measurement operations have shown that human tracking of objects of high velocities and accelerations are inadequate.

A basic problem in automatic acquisition of a target in a range tracking system using a conventional time demodulator is the placing of range information (in the form of a voltage) relative to the acquired target on a storage capacitor forming part of a range unit in the range track loops. The aforesaid range unit is a function unit as shown and described in volume 20 of Radiation Laboratory Series (1949), pages 276–280, 281–304. Existing range tracking systems have utilized two methods having certain disadvantages. In one method, the capacitor is made to follow the range sweep of a time modulator until a desired voltage is reached whereupon the sweep voltage is stopped, and retained by the capacitor. This method usually requires accompanying means for rapidly discharging the capacitor in the event the acquisition information was in error.

The other method consists of connecting an auxiliary loop in the range track system in which acquisition is effected on a time basis by an auxiliary time demodulator which is supplied target information and some form of time varying voltage. Transfer of the time information to voltage information for the range capacitor is effected by the degenerative nature of the main tracking loop when the reference voltage of the auxiliary loop is reduced to its quiescent value. The charging current for the capacitor in this instance is furnished by the time discrimination itself. This method results in a compromise between minimum bandwidth of the tracking loop and minimum delay of acquisition.

The present invention differs basically from the aforegoing two methods and has the advantage of simplification in practice without compromise of accuracy or bandwidth in realistic applications.

In accordance with the present invention, the target acquisition circuit is furnished video target information along with range and time information from a range track loop. As a result the acquisition circuit then furnishes a voltage indicative of the range of either the target to be acquired or perhaps an assumed target which later must be verified, and may prove to be false (hereafter referred to as a false alarm). This voltage is supplied to a storage circuit which then serves as the supply source for the charging of a range capacitor.

The stored voltage is coupled to the range capacitor through a cathode follower stage having an extremely low output impedance. The voltage being fed to the range capacitor is controlled by a switch which remains closed during the target acquisition. Upon acquisition of a target the switch opens. In the event of a false alarm the switch does not open and the voltage provided by the storage circuit will quickly return to its quiescent value. Thus false alarms are taken care of without auxiliary circuitry.

It is an object of this invention to provide a novel method for transfer of acquisition information to a range track loop in a range tracking system.

It is another object of this invention to provide a novel method for transfer of acquisition information to a range track loop in a range tracking system and to then dispose of said acquisition information if it is caused by a false alarm.

These and other objects and advantages of my present invention will suggest themselves to those skilled in the art and will become apparent from the following description of the invention taken in connection with the accompanying drawing.

Acquisition system 2 is furnished video target signals by way of terminal 1. Along with video target signals, acquisition system 2 receives range information from range unit 3 and time information from time modulator 4. As a result acquisition system 2 furnishes a voltage to storage circuit 5. The voltage is indicative of the range of either the target to be acquired or an assumed target which later must be verified and may prove to be false (hereafter referred to as a false alarm).

Storage circuit 5 then serves as the supply source for the charging of range capacitor 9. The stored voltage is coupled to range capacitor 9 through cathode follower stage 6, electro magnetic switch 7 and series resistor 8. Cathode follower stage 6 has an extremely low output impedance. Switch 7 is closed during acquisition of a target and for a prescribed period thereafter as determined by time delay 10. Series resistor 8 permits range capacitor 9 to charge slowly during the time before switch 7 opens, thereby greatly reducing the peak current demands on the supply stage resulting in considerable simplification thereof. During this time, the correct range voltage is still furnished as required by range unit 3 by virtue of its connection to the upper end of series resistor 8. After range capacitor 9 has been allowed to charge fully several time constants, series resistor 8 times range capacitor 9, electromagnetic switch 7 will be actuated by a signal indicating a target has been acquired. The actuating signal is received from terminal 12. The signal indicating target acquisition will be delayed for a prescribed period of time in time delay 10 then will open electromagnetic switch 7. The input to range unit 3 is the voltage across range capacitor 9 by virtue of the absence of any current flow in series resistor 8.

In the event of a false alarm, electromagnetic switch 7 does not open as there is lacking any signal indicating target acquisition and the voltage provided by the storage circuit will quickly return to its quiescent value; however during the time that the false voltage was present range capacitor 9 will have become partially charged. This condition is of no consequence so long as cathode follower stage 6 has an impedance sufficiently low so that the division of voltage between series resistor 8 and range capacitor 9 (and hence the instantaneous current drawn), will not materially charge the voltage at the upper end of series resistor 8. With this condition, the division of voltage between series resistor 8 and range capacitor 9 establishes an equilibrium which does not affect the future operation of the acquisition or range track circuits. Thus, false alarms are taken care of without auxiliary equipment.

The low impedance of cathode follower stage 6 and the large storage time required for storage circuit 5 is made compatible by the use of negative feedback as indicated by the dotted line.

While there has been described what is at present considered to be the preferred embodiment of the invention, it will be obvious to those skilled in the art that various changes and modification may be made therein without departing from the spirit and scope of the invention.

What is claimed is:

1. A system for transferring range information to a range track loop comprising an acquisition circuit to provide a voltage indicative of the range of the target to be acquired, a first storage circuit adapted to receive said voltage, and a cathode follower stage having a low output impedance and adapted to receive the output of said first storage means, a second storage circuit adapted to receive the output of said cathode follower stage, said second storage circuit also including a two-position switch and a resistor, said switch being normally in the closed position, control means to cause said switch to open, said control means being actuated upon the receipt of a signal indicating target acquisition, and means for coupling the output of said second storage circuit to said range track loop.

2. A system for transferring range information to a range track loop as defined in claim 1 wherein said second storage circuit also includes a storage capacitor for holding the range information pending target acquisition.

3. A system for transferring range information to a range track loop as defined in claim 1 wherein said switch control means includes delay means adapted to receive said actuating signal, and an electromagnetic relay actuated by the output of said delay means.

4. A system for transferring range information to a range track loop comprising an acquisition circuit to provide a voltage indicative of the range of the target to be acquired, first storage means adapted to receive said range voltage, a cathode follower stage having an extremely low output impedance adapted to receive the output of said first storage means, a two-position switch, said switch in one position connecting the output of said cathode follower stage to a resistor, and in the other position disconnecting the output of said cathode follower stage from said resistor, control means to cause said switch to assume said disconnect position upon the receipt of an actuating signal indicative of target acquisition, second storage means being connected to said resistor, and coupling means to provide said range track loop with the output from said second storage means.

5. A system for transferring range information to a range track loop as defined in claim 4, wherein said second storage means is comprised of a capacitor for holding the range information pending target acquisition.

No references cited.